US 6,557,109 B1

(12) United States Patent
Sato

(10) Patent No.: US 6,557,109 B1
(45) Date of Patent: Apr. 29, 2003

(54) SYNCHRONIZING DEVICE AND METHOD THAT ADJUSTS READOUT SPEED ACCORDING TO REMAINING QUANTITY OF DATA IN MEMORY WHILE OPERATING DECODER ON FIXED FREQUENCY SYSTEM CLOCK

(75) Inventor: Shinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/454,914

(22) Filed: Dec. 6, 1999

(30) Foreign Application Priority Data

Dec. 7, 1998 (JP) .......................................... 10-347554

(51) Int. Cl.⁷ ................................................ G06F 5/06
(52) U.S. Cl. ............................ 713/502; 710/57; 710/58
(58) Field of Search ..................... 710/57, 58; 713/500, 713/502; 369/47.28; 370/503; 375/358

(56) References Cited

U.S. PATENT DOCUMENTS

| | | | | |
|---|---|---|---|---|
| 4,942,553 A | * | 7/1990 | Dalrymple et al. ............ 710/57 |
| 5,502,655 A | * | 3/1996 | McClure ...................... 702/127 |
| 5,901,149 A | * | 5/1999 | Itakura et al. ................. 341/51 |
| 6,172,964 B1 | * | 1/2001 | Whitton ....................... 370/230 |
| 6,173,114 B1 | * | 1/2001 | Yanagihara et al. ..... 369/47.28 |

FOREIGN PATENT DOCUMENTS

| | | |
|---|---|---|
| JP | 2-15752 | 1/1990 |
| JP | 4-115753 | 4/1992 |
| JP | 4-288742 | 10/1992 |
| JP | 6-61966 | 3/1994 |
| JP | 9-298734 | 11/1997 |
| JP | 9-321807 | 12/1997 |

OTHER PUBLICATIONS

Japan Patent Office Office Action issued Jun. 25, 2002; English translation of encircled, relevant passages.
"Point Pictorial System The Newest MPEG Test Book", Society for the Study of Multi–Media Communication, pp. 237, Aug. 1, 1994.

* cited by examiner

Primary Examiner—Thomas Lee
Assistant Examiner—Albert Wang
(74) Attorney, Agent, or Firm—Whitham, Curtis & Christofferson, P.C.

(57) ABSTRACT

A synchronizing device and a synchronizing method whose constitution is simple and whose operation is easy to be stabilized are provided. A subtracter subtracts a value of a read pointer which calculates number of data read-out from a memory device from a value of a write pointer which calculates number of data written in the memory device to obtain subtraction value, thus causing the subtraction value to be given to a judging unit as detection data remaining quantity. The judging unit outputs comparison result signal while comparing detection data remaining quantity with reference value. A number of data increasing/decreasing unit receives data from a decoder for decoding data of the memory device. The number of data increasing/decreasing unit causes remaining quantity of data of the memory device to be prescribed value with data reading-out speed of the memory device controlled in such a way that it controls quantity of data outputted, while replying to comparison result signal from the judging unit.

6 Claims, 2 Drawing Sheets

SYNCHRONIZING DEVICE AND METHOD THAT ADJUSTS READOUT SPEED ACCORDING TO REMAINING QUANTITY OF DATA IN MEMORY WHILE OPERATING DECODER ON FIXED FREQUENCY SYSTEM CLOCK

BACKGROUND OF THE INVENTION

The present invention relates to a synchronizing device and a synchronizing method. More to particularly this invention relates to a synchronizing device and a synchronizing method in a transmission system which uses MPEG (Moving Picture Experts Group) and so forth.

DESCRIPTION OF THE PRIOR ART

Generally, in a transmission system such as broadcasting and so forth using the MPEG standard, timing of regeneration of data in the reception side is necessarily synchronized with the sending side. This is because if the timing of regeneration is too fast, the reception side will have insufficient data (underflow). Conversely, if the timing of regeneration is too slow, the reception side will have too much data (overflow). Hence, synchronizing devices are used to cause the timing of the reception side to be synchronized with the timing of the sending side.

Formerly, the synchronizing device described in "Point Pictorial System The Newest MPEG Text Book" (author, supervision: Hiroshi Fujiwara, editor: Society for the Study of Multi-Media Communication) pp. 237, Aug. 1, 1994, is well known. This synchronizing device is generally designated as PLL (Phase Locked Loop) circuit. As shown in FIG. 1, the synchronizing device comprises a Digital Analog Converter DAC 201, a Low Pass Filter LPF 202, a Voltage Control Oscillator VCO 203, System Time Clock STC 204 (synchronous signal counter), and a subtracter 205. The output of the Digital Analog Converter 201 controls frequency of a clock signal which the Voltage Control Oscillator 203 oscillates through the Low Pass Filter 202. The clock signal which the Voltage Control Oscillator 203 outputs is counted by the System Time Clock 204 to be inputted to the subtracter 205. It is obtained difference between System Clock Reference (SCR) or Program Clock Reference (PCR) included in the MPED data and the value of the System Time Clock (STC) 204 by the subtracter 205, thus being inputted to the Digital Analog Converter (DAC) 201. The difference converted into the analog value is inputted to the Voltage Control Oscillator (VCO) 203 through the Low Pass Filter (LPF) 202. The Voltage Control Oscillator (VCO) 203 changes the frequency of the clock signal which oscillates in accordance with value of difference. For instance, when the value of the System Clock Reference (SCR) or the value of the Program Clock Reference (PCR) is larger than the value of the System Time Clock (STC) 204, the frequency of the clock signal which the Voltage Control Oscillator (VCO) 203 oscillates changes in the direction that the frequency becomes large. To the contrary, when the value of the System Clock Reference (SCR) or the value of the Program Clock Reference (PCR) is smaller than the value of the System Time Clock (STC) 204, the frequency of the clock signal which the Voltage Control Oscillator (VCO) 203 oscillates changes in the direction that the frequency becomes small. According to the operation, the synchronizing device generates clock signal synchronized with sending side of the data. The regeneration circuit of the MPEG data is capable of executing regeneration synchronized with the sending side in such a way that the regeneration circuit of the MPEG data regenerates the clock signal synchronized with the sending side as the reference clock signal.

However, in the conventional synchronizing device, analog devices such as the Low Pass Filter (LPF), the Voltage Control Oscillator: (VCO), and so forth are used. Since characteristics of these analog devices are easily changed by variations in temperature and power source voltage, it is difficult to stabilize operation of the device.

Further, in the conventional synchronizing device, the clock of 27 MHz is necessary for the MPEG. The processing that it achieves synchronization with frequency of the clock changed delicately while referring to the value of the System Clock Reference (SCR) or the value of the Program Clock Reference (PCR), is incapable of being realized by the CPU of the personal computer which is used generally, therefore, there is the problem that it is difficult to be realized by software.

SUMMARY OF THE INVENTION

In view of the foregoing, it is an object of the present invention, in order to overcome the above-mentioned problems, to provide a synchronizing device and a synchronizing method whose constitution is simple, and whose operation is easily stabilized.

It is another object of the present invention, to provide a synchronizing device and a synchronizing method which is easily realized by software.

According to a first aspect of the present invention, in order to achieve the above-mentioned objects, there is provided a synchronizing device which comprises a memory device for storing therein data temporarily, a data reading-out means for reading data of the memory device, a data remaining quantity detection means for detecting remaining quantity of the data of the memory device, and a data reading-out speed control means for causing remaining quantity of the data of the memory device to be prescribed value while controlling data reading-out speed of the data reading-out means based on detection data remaining quantity detected by the data remaining quantity detection means.

According to a second aspect of the present invention, in the first aspect, there is provided a synchronizing device, wherein the data remaining quantity detection means of the synchronizing device comprises a write pointer for calculating number of data written in the memory device, a read pointer for calculating number of data read from the memory device, and a subtracter for subtracting value of the read pointer from value of the write pointer to obtain subtraction value before giving it to the data reading-out speed control means with the subtraction value as the detection data remaining quantity.

According to a third aspect of the present invention, there is provided a synchronizing device which comprises a memory device for storing therein data temporarily, a data reading-out means for reading data of the memory device a data remaining quantity detection means for detecting remaining quantity of the data of the memory device, a decoder for receiving data read-out from the data reading-out means, a number of data increasing/decreasing unit for receiving data from the decoder, and a data reading-out speed control means for causing remaining quantity of data of the memory device to be prescribed value while controlling data reading-out speed of the data reading-out means in such a way that it controls quantity of data outputted from the number of data increasing/decreasing unit based on detection data remaining quantity detected by the data remaining quantity detection means.

According to a fourth aspect of the present invention, in the third aspect, there is provided a synchronizing device, wherein the data remaining quantity detection means comprises a write pointer for calculating number of data written in the memory device, a read pointer for calculating number of data read from the memory device, and a subtracter for subtracting value of the read pointer from value of the write pointer to obtain subtraction value before giving it to the data reading-out speed control means with the subtraction value as the detection data remaining quantity.

According to a fifth aspect of the present invention, there is provided a synchronizing method which comprises the steps of a storing step for storing data temporarily according to a memory device, a data reading-out step for reading data of the memory device by data reading-out means, a data remaining quantity detecting step for detecting remaining quantity of data of the memory device, and a data reading-out speed controlling step for causing remaining quantity of the memory device to be prescribed value while controlling data reading-out speed of the data reading-out means based on detection data remaining quantity detected by the data remaining quantity detecting step.

According to a sixth aspect of the present invention, there is provided a synchronizing method which comprises the steps of a storing step for storing data temporarily according to a memory device, a data reading-out step for reading data of the memory device by data reading-out means, a data remaining quantity detecting step for detecting remaining quantity of data of the memory device, a step for receiving data read-out by the data reading-out means according to a decoder, a step for receiving data from the decoder according to a number of data increasing/decreasing unit, a data reading out speed controlling step for causing remaining quantity of data of the memory device to be prescribed value while controlling data reading-out speed of the data reading-out means in such a way that it controls quantity of data outputted from the number of data increasing/decreasing unit based on detection data remaining quantity detected by the data remaining quantity detecting step.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will now be described in detail in accordance with the accompanying drawings.

Figure 1:
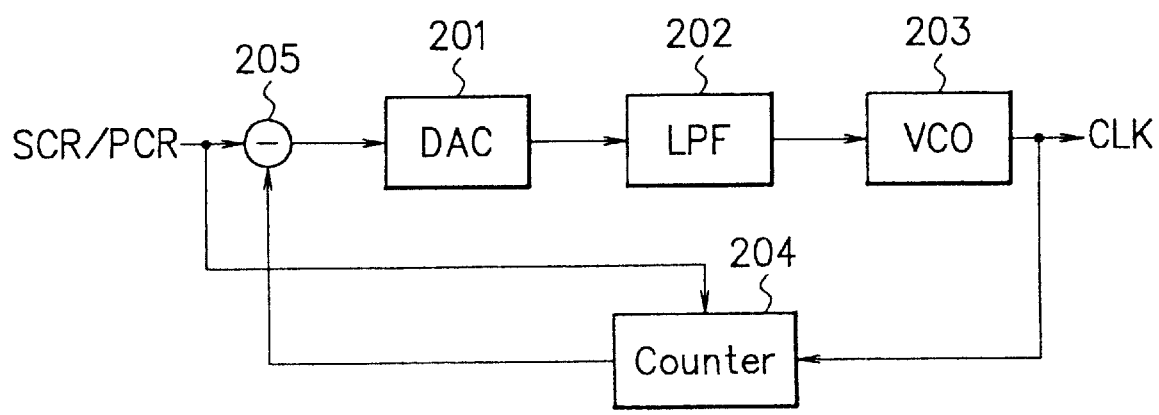
FIG. 1 is a block diagram showing conventional synchronizing device.
Figure 2:
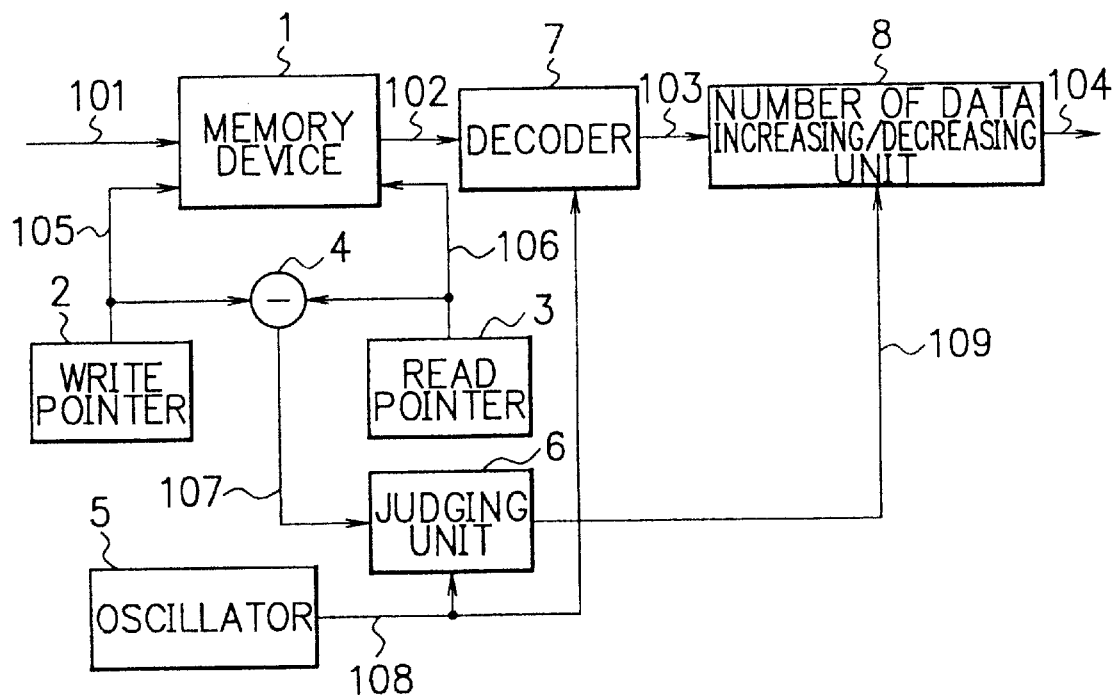
FIG. 2 is a block diagram showing a synchronizing device as a first embodiment of the present invention.

FIG. 2 shows a block diagram showing a synchronizing device as a first embodiment of the present invention. Referring to FIG. 2, the synchronizing device as the first embodiment of the present invention comprises a memory device 1, a write pointer 2, a read pointer 3, a subtracter 4, an oscillator 5, a judging unit 6, a decoder 7, and a number of data increasing/decreasing unit 8. The write pointer 2 is connected to the memory device 1. The read pointer 3 is connected to the memory device 1. The subtracter 4 is connected both to the write pointer 2 and the read pointer 3. The judging unit 6 is connected to the subtracter 4 and the oscillator 5. The decoder 7 is connected to the memory device 1 and the oscillator 5. The number of data increasing/decreasing unit 8 is connected to the judging unit 6 and the decoder 7.

The memory device 1 is a dual port memory whose writing bus and reading bus are separated. The write-in of the data is executed with the value of the write pointer 2 as an address. The reading of the data is executed with the value of the read pointer 3 as an address. The memory device 1 works as FIFO (First In First Out) memory device by virtue of the write pointer 2 and the read pointer 3, thus the MPEG data is stored temporarily. The MPEG data read out from the memory device 1 is sent to the decoder 7. The value of the write pointer 2 and the read pointer 3 are also inputted to the subtracter 4. The subtracter 4 subtracts the value of the read pointer 3 from the value of the write pointer, 2 to obtain the subtraction value. The subtracter 4 outputs the subtraction value as detected data remaining quantity 107 of the memory device 1. The oscillator 5 outputs the clock signal 108 of fixed frequency (for instance in the case of MPEG, 27 MHz). The judging unit 6 monitors the detected data remaining quantity 107 to inform the state thereof to the number of data increasing/decreasing unit 8. The number of data increasing/decreasing unit 8 increases or decreases quantity of data sent from the decoder 7 according to the state.

Figure 3:
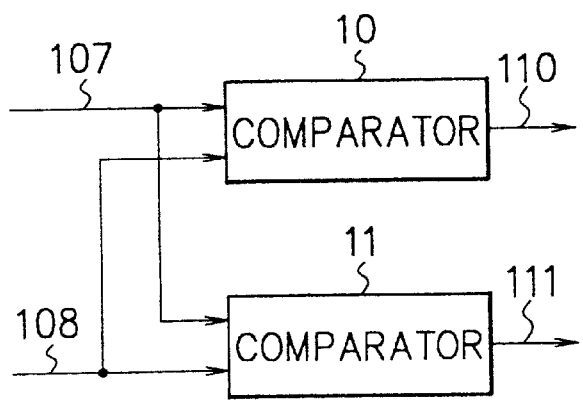
FIG. 3 is a block diagram showing a discriminator of the synchronizing device of FIG. 2.

As shown in FIG. 3, the judging unit 6 consists of two comparators 10 and 11. The comparator 10 is connected to the subtracter 4, the oscillator 5, and the number of data increasing/decreasing unit 8. The comparator 11 is also connected to the subtracter 4, the oscillator 5, and the number of data increasing/decreasing unit 8. The comparator 10 compares the detection data remaining quantity 107 from the subtracter 4 with the reference value. When the detection data remaining quantity 107 is larger than the reference value, the comparator 10 outputs comparison result signal 110, in the fixed period, namely, during period of fixed cycle of the clock signal 108. The comparator 11 compares the detection data remaining quantity 107 from the subtracter 4 with the reference value. When the detection data remaining quantity 107 is smaller than the reference value, the comparator 11 outputs comparison result signal 111, in the fixed period, namely, during period of fixed cycle of the clock signal 108. The comparator 10 outputs one of either the comparison result signal 110 or the comparison result signal 111 as the comparison result signal 109 (FIG. 2).

Next, there will be described operation of the synchronizing device. The data sent from the sending side is written in an address which the write pointer 2 of the memory device 1 indicates, then increasing the value of the write pointer 2 by 1 (one). Further, on the occasion of data reading, the data is read from the address which the read pointer 3 indicates to increase the value of the read pointer 3 by 1 (one). According to this operation, the memory device 1 works as the FIFO memory device.

The data read is sent to the decoder 7. When the decoder 7 is, for instance, the decoder of the MPEG video, decompressed moving image data 103 is outputted according to input of MPEG video stream data 102. The subtracter 4 subtracts the value of the read pointer 3 from the value of the write pointer 2 to output the detection data remaining quantity 107 existing in the memory device 1. For instance, on the supposition that the processing system is the MPEG processing system, the oscillator 5 is oscillating the clock signal 108 of 27 MHz. The judging unit 6 monitors whether the detection data remaining quantity 107 is close to the state of the whole capacity of the memory device 1 or is close to the state of empty to inform thereof to the number of data increasing/decreasing unit 8. The number of data increasing/decreasing unit 8 increases or decreases data quantity of the decompressed moving image data 103 from the decoder 7 according to the comparison result signal 109 of the judging unit 6. For instance, the number of data increasing/decreasing unit 8, when the data 103 is moving image data, causes the data to be deleted in every frame unit with fixed rate, and causes the data to be inserted so as to repeat the same frame.

Here, for instance, suppose that the clock signal 108 outputted from the oscillator 5 has a low frequency in comparison with the clock signal of the sending side. In this case, the timing of outputting the data 104 is slower than at the sending side and consequently, the timing which the decoder 7 decodes is slow too. As a result, the data quantity read from the memory device 1 is less than the data quantity which is written, and thus the detection data remaining quantity 107 increases. When the judging unit 6 detects that the detection data remaining quantity 107 is increasing, the judging unit 6 informs the number of data increasing/decreasing unit 8. The number of increasing/decreasing unit 8 reduces quantity of the data 104 so that the timing of output becomes fast, thus approaching the timing of the sending side. Further, the data quantity which the decoder 7 reads-out from the memory device 1 increases, so that the detection data remaining quantity decreases.

Conversely, when the clock signal 108 outputted from the oscillator 5 has high frequency in comparison with the clock signal of the sending side, the timing outputting the data 104 is faster than the timing supposed by the sending side, and the timing which the decoder 7 decodes is fast too. As a result, the data quantity read-out from the memory device 1 is greater than the data input to the memory device 1, and the detection data remaining quantity decreases. When the judging unit 6 detects that the detection data remaining quantity 107 is decreasing, the judging unit 6 informs the number of data increasing/decreasing unit 8. The number of data increasing/decreasing unit 8 increases quantity of the data 104 so that the timing of output becomes slow, thus approaching the timing of the sending side. Further, the data quantity which the decoder 7 reads-out from the memory device 1 decreases so that the detection data remaining quantity increases.

Next, there will be described a synchronizing device as a second embodiment of the present invention. The second embodiment consists of software. In this case, reference time is established by using timer function of OS (Operating System) instead of the oscillator 5. The memory device 1 is secured on the main memory device 1, and variables are used as values of the write pointer 2 and the read pointer 3. The subtracter 4, the judging unit 6, the decoder 7, and the number of data increasing/decreasing unit 8 are constituted by routine respectively. According to this configuration, it is capable of realizing the configuration identical with the first embodiment. The second embodiment of the present invention has the effect that since the synchronizing device is constituted by only software, it is unnecessary to obtain hardware, and thus the synchronizing device is realized at a low price in addition to the effect of the first embodiment.

As described above, according to the present invention, since the synchronizing device consists of only the digital device with cheap and stable components, it is unnecessary to prepare special hardware, and thus constitution is simple and stabilization of operation is easy.

Further, according to the present invention, since there is no part that it should be processed in special high speed, thus it is easy to be realized by software.

While preferred embodiments of the invention have been described using specific terms, the description has been for illustrative purposes only, and it is to be understood that changes and variations may be made without departing from the spirit or scope of the following claims.

What is claimed is:

1. A synchronizing device comprising:
   a memory device for storing therein data temporarily;
   a data reading-out means for reading data in said memory device;
   a decoder for receiving data from the data reading-out means;
   a data remaining quantity detection means for detecting remaining quantity of the data in said memory device; and
   a data reading-out speed control means for causing remaining quantity of the data in said memory device to be within a prescribed range by controlling data reading-out speed of said data reading-out means based on detection of remaining quantity of data detected by said data remaining quantity detection means;
   a fixed-frequency system clock for providing timing signals to the decoder.

2. A synchronizing device as claimed in claim 1, wherein said data remaining quantity detection means comprises:
   a write pointer for calculating number of data written in said memory device;
   a read pointer for calculating number of data read from said memory device; and
   a subtracter for subtracting value of said read pointer from value of said write pointer to obtain subtraction value before giving the subtraction value to said data reading-out speed control means as said detection data remaining quantity.

3. A synchronizing device comprising:
   a memory for storing therein data temporarily;
   a data reading-out means for reading data from said memory device;
   a data remaining quantity detection means for detecting remaining quantity of the data in said memory device;
   a decoder for receiving data from said data reading-out means;
   a fixed-frequency system clock for providing timing signals to the decoder;
   a number of data increasing/decreasing unit for receiving data from said decoder; and
   a data reading-out speed control means for causing remaining quantity of data in said memory device to be within a prescribed range by controlling data read-out speed of said data reading-out means such that it controls quantity of data outputted from said number of data increasing/decreasing unit based on detection of remaining quantity of data detected by said data remaining quantity detection means.

4. A synchronizing device as claimed in claim 3, wherein said data remaining quantity detection means comprises:

a write pointer for calculating number of data written in said memory device;

a read pointer for calculating number of data read from said memory device; and a subtracter for subtracting value of said read pointer from value of said write pointer to obtain subtraction value before giving the subtraction value to said data reading-out speed control means as said detection data remaining quantity.

5. A synchronizing method comprising the steps of:

storing data temporarily in a memory device;

reading data of said memory device by data reading-out means, and passing the data to a decoder;

operating the decoder according to a fixed-frequency system clock;

detecting remaining quantity of data of in said memory device; and causing remaining quantity of data in said memory device to be within a prescribed range by controlling data reading-out speed of said data reading-out means based on detection of remaining quantity of data detected in said data remaining quantity detecting step.

6. A synchronizing method comprising the steps of:

storing data temporarily in a memory device;

reading data in said memory device by data reading-out means;

detecting remaining quantity of data in said memory device;

receiving data read-out by said data reading-out means into a decoder, wherein the decoder is operated according to a fixed frequency system clock;

receiving data from said decoder into a number of data increasing/increasing unit;

causing remaining quantity of data in said memory device to be within a prescribed range by controlling data reading-out speed of said data reading-out means such that it controls quantity of data outputted from said number of data increasing/decreasing unit based on detection of remaining quantity of data detected in said data remaining quantity detection step.

* * * * *